(12) United States Patent
Maki

(10) Patent No.: US 10,899,334 B2
(45) Date of Patent: Jan. 26, 2021

(54) TORQUE LIMITING CLUTCH

(71) Applicant: TEAM Industries, Inc., Bagley, MN (US)

(72) Inventor: Gregory Lee Maki, Solway, MN (US)

(73) Assignee: TEAM Industries, Inc., Bagley, MN (US)

( * ) Notice: Subject to any disclaimer, the term of this patent is extended or adjusted under 35 U.S.C. 154(b) by 34 days.

(21) Appl. No.: 16/169,854

(22) Filed: Oct. 24, 2018

(65) Prior Publication Data
US 2019/0126902 A1 May 2, 2019

Related U.S. Application Data

(60) Provisional application No. 62/577,913, filed on Oct. 27, 2017.

(51) Int. Cl.
*F16D 7/02* (2006.01)
*B60W 10/10* (2012.01)
(Continued)

(52) U.S. Cl.
CPC ............ *B60W 10/10* (2013.01); *B60W 30/19* (2013.01); *F16D 7/025* (2013.01); *F16D 7/027* (2013.01);
(Continued)

(58) Field of Classification Search
CPC ...... B60W 10/10; B60W 30/19; B60W 10/06; B60W 2710/027; B60W 2710/0666;
(Continued)

(56) References Cited

U.S. PATENT DOCUMENTS 4,561,855 A * 12/1985 Kondo .................. F16D 7/027
192/70.19
5,501,636 A * 3/1996 Janke ...................... F16D 7/025
464/48
(Continued)

FOREIGN PATENT DOCUMENTS

DE          10305240 A1   8/2004
DE     102005014913 A1  10/2006
(Continued)

OTHER PUBLICATIONS

International Bureau, "International Preliminary Report on Patentability from PCT Application No. PCT/US2018/057383", from Foreign Counterpart to U.S. Appl. No. 16/169,854, dated May 7, 2020, p. 1 through 9, Published: WO.
(Continued)

*Primary Examiner* — David J Hlavka
(74) *Attorney, Agent, or Firm* — Fogg & Powers LLC

(57) ABSTRACT

A torque limiting clutch that includes an input member and at least two output members is provided. The input member is configured to receive torque. Each output member is in operational communication with the input member to transfer torque between the input member and each output member. Each output member is configured to slip the operational communication with the input member when a torque above a set torque limit is encountered. Further wherein the slip of the operational communication between the input member and one output member of the at least two output members is independent of the operational communication between the input member and any other output member of the at least two output members.

20 Claims, 20 Drawing Sheets

(51) Int. Cl.
*F16D 11/14* (2006.01)
*F16H 48/19* (2012.01)
*B60W 30/19* (2012.01)
*B60W 10/06* (2006.01)

(52) U.S. Cl.
CPC ............. *F16D 11/14* (2013.01); *F16H 48/19* (2013.01); *B60W 10/06* (2013.01); *B60W 2710/027* (2013.01); *B60W 2710/0666* (2013.01); *B60W 2710/083* (2013.01)

(58) Field of Classification Search
CPC .. B60W 2710/083; F16D 11/14; F16D 7/025; F16D 7/027; F16H 48/19
See application file for complete search history.

(56) References Cited

U.S. PATENT DOCUMENTS

| | | | | |
|---|---|---|---|---|
| 6,874,606 | B1* | 4/2005 | Heidenreich | F16D 7/027 |
| | | | | 192/104 F |
| 9,346,354 | B2* | 5/2016 | Valente | B60K 23/0808 |
| 2002/0125095 | A1* | 9/2002 | Ochab | F16D 41/067 |
| | | | | 192/35 |
| 2003/0186772 | A1* | 10/2003 | Grogg | F16H 48/05 |
| | | | | 475/198 |
| 2006/0160652 | A1* | 7/2006 | Maki | F16H 48/22 |
| | | | | 475/248 |
| 2011/0297460 | A1* | 12/2011 | Chess | B66F 9/07568 |
| | | | | 180/6.66 |
| 2014/0051541 | A1* | 2/2014 | Osborn | B60K 23/0808 |
| | | | | 475/209 |
| 2016/0039284 | A1* | 2/2016 | Osborn | F16H 48/22 |
| | | | | 180/245 |

FOREIGN PATENT DOCUMENTS

| | | |
|---|---|---|
| DE | 102010039445 A1 | 2/2012 |
| EP | 0107903 A2 | 5/1984 |
| EP | 1279546 A2 | 1/2003 |
| EP | 1279546 A3 | 2/2003 |
| FR | 525425 A | 9/1921 |

OTHER PUBLICATIONS

International Searching Authority, "International Search Report and Written Opinion from PCT Application No. PCT/US2018/057383 dated Mar. 1, 2019", from Foreign Counterpart to U.S. Appl. No. 16/169,854, pp. 1-15, Published: WO.

* cited by examiner

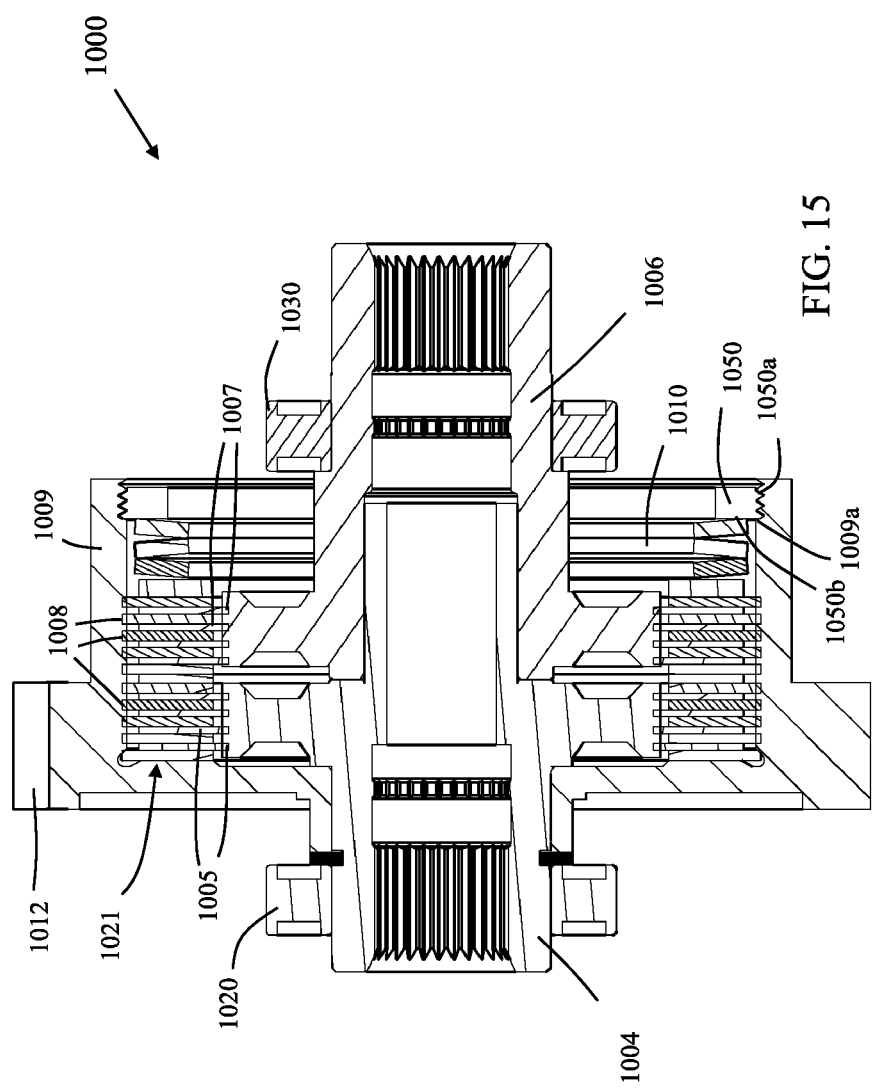

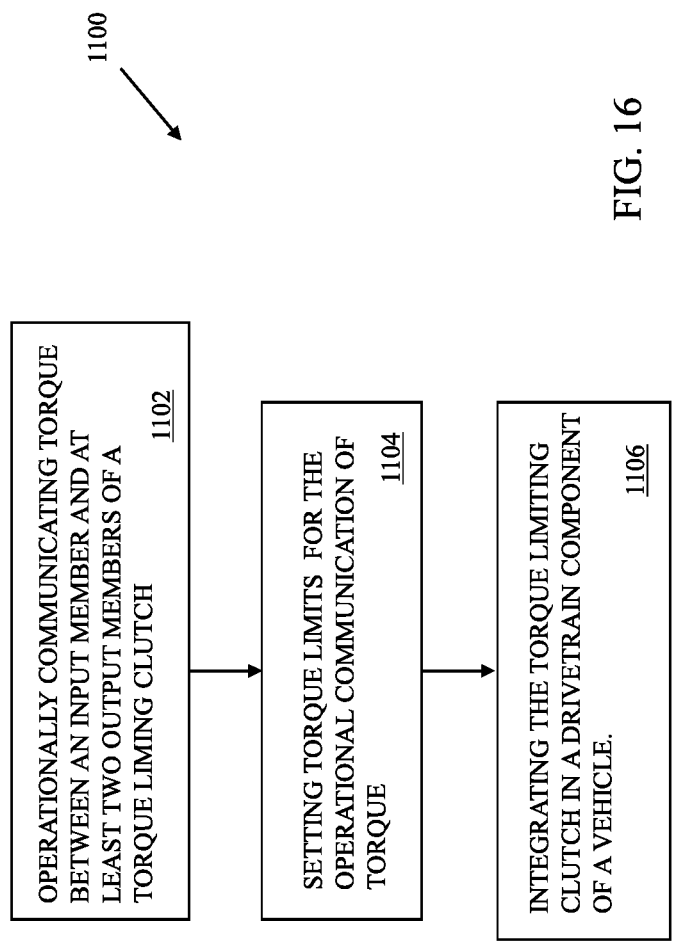

TORQUE LIMITING CLUTCH

CROSS-REFERENCE TO RELATED APPLICATIONS

This Application claims priority to U.S. Provisional Application Ser. No. 62/577,913, same title herewith, filed on Oct. 27, 2017, which is incorporated in its entirety herein by reference.

BACKGROUND

A described herein the term "drivetrain" is used to describe the components of a vehicle that couple the engine power or torque to the wheels of the vehicle. Components of the drivetrain are typically designed to anticipate predetermined torque loads. However, applications may encounter scenarios where the system torque may exceed a design limit for a component. For example, this may occur as the result of abuse, an accident, another system component failure that causes a jam, a vehicle being used in a new application that subjects it to larger loads, etc. In some applications, packaging constraints may not allow adequate room to make drivetrain components robust enough to handle extraordinary torque loads.

Peak torque limiters have been developed to address anticipate torque loads. Currently, there are many different types of peak torque limiters. Examples include shear pins or shear keys, wrap spring clutches, viscous fluid couplers, magnetic coupling clutches, pneumatic or hydraulic clutches, multi-plate wet or dry clutch, cone clutch, jaw clutch (face cams) and ball ramps. Some clutches completely cut the power flow path and need to be reset after overload is removed, some continue to transfer torque, but at a limited level.

Many of the commercially available peak torque limiters are configured so power flows coaxially from one shaft, through the limiting mechanism, and out through another shaft. They have a single input and single output. Others available systems have the power flow in from a gear, sprocket, or pulley mounted on the clutch assembly, through the limiting mechanism, and out thru a shaft. These designs still have one input and one output.

SUMMARY

The following summary is made by way of example and not by way of limitation. It is merely provided to aid the reader in understanding some of the aspects of the subject matter described. Embodiments provide a torque limiting clutch in the driveline to protect the driveline components when the driveline experiences higher than normal torque loads. In one embodiment, a torque limiting clutch in a drivetrain of a vehicle is provided with an input member to receive torque and at least two output members configured to slip independently.

In one embodiment, a torque limiting clutch that includes an input member and at least two output members is provided. The input member is configured to receive torque. Each output member is in operational communication with the input member to transfer torque between the input member and each output member. Each output member is configured to slip the operational communication with the input member when a torque above a set torque limit is encountered. Further wherein the slip of the operational communication between the input member and one output member of the at least two output members is independent of the operational communication between the input member and any other output member of the at least two output members.

In another embodiment, a vehicle with drivetrain protection is provided. The vehicle includes a motor to generate engine torque, a drivetrain operationally coupled to receive the engine torque from the motor and a torque limiting clutch integrated within a component of the drivetrain. The torque limiting clutch includes an input member and at least two output members. The input member is operationally coupled to receive the engine torque. Each output member is in operational communication with the input member to transfer torque between the input member and each output member. Each output member is configured to slip the operational communication with the input member when a torque above a set limit is encountered. The slip of the operational communication between the input member and one output member of the at least two output members is independent of the operational communication between the input member and any other output member of the at least two output members.

In yet another embodiment, a method of protecting vehicle drivetrain components is provided. The method includes operationally communicating torque between an input member and at least two output members of the torque limiting clutch, wherein torque communication between the input member and one of the at least two output members is independent from the torque communication between the input member and each other output member of the at least two output members; setting torque limits for the operationally communicated torque between the first input member and each of the at least two outputs; and positioning an input member of a torque limiting clutch in an engine torque path within a drivetrain component of a drivetrain.

BRIEF DESCRIPTION OF THE DRAWINGS

Embodiments can be more easily understood and further advantages and uses thereof will be more readily apparent, when considered in view of the detailed description and the following figures in which:

FIG. 15 is a cross-sectional rear view of a torque limiting clutch according to further yet another exemplary embodiment; and FIG. 16 is an application flow diagram of an exemplary embodiment.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a torque limiting clutch in the drivetrain to protect the drivetrain components when the components experience higher than normal torque loads. Torque limiting clutches are sometimes referred to as a torque limiter, spike load limiter, Peak Torque Limiter (PTL), an overload clutch, a slip clutch and slippers. However, embodiments hereafter may be referred to as a PTL or a torque limiting clutch (TLC).

In one embodiments the TLC has a single input member, but two or more output members. The output members may have the same torque limit magnitude, or be set with different torque limits. The two output members may slip at the same time (in sync with each other), or they may slip independent of each other.

Further in an embodiment, the TLC is built into rear output gear assembly of a rear axle allowing the left and right axles (the outputs) to slip independently, allowing the TLC to protect the halfshafts. Further in an embodiment, the TLC is built into an output gear of a main transmission. The outputs may be the front and rear drive shafts (prop shafts). This allows an overload at the rear drive shaft (rear axle's combined torque) to slip only the TLC's rear output. The same applies to an overload at the front axle. Another possibility for this embodiment is that it may be desirable to have a different torque setting for the front and rear outputs. This may be helpful where the front axle gear box is weaker than the rear axle gear box.

Figure 1A:
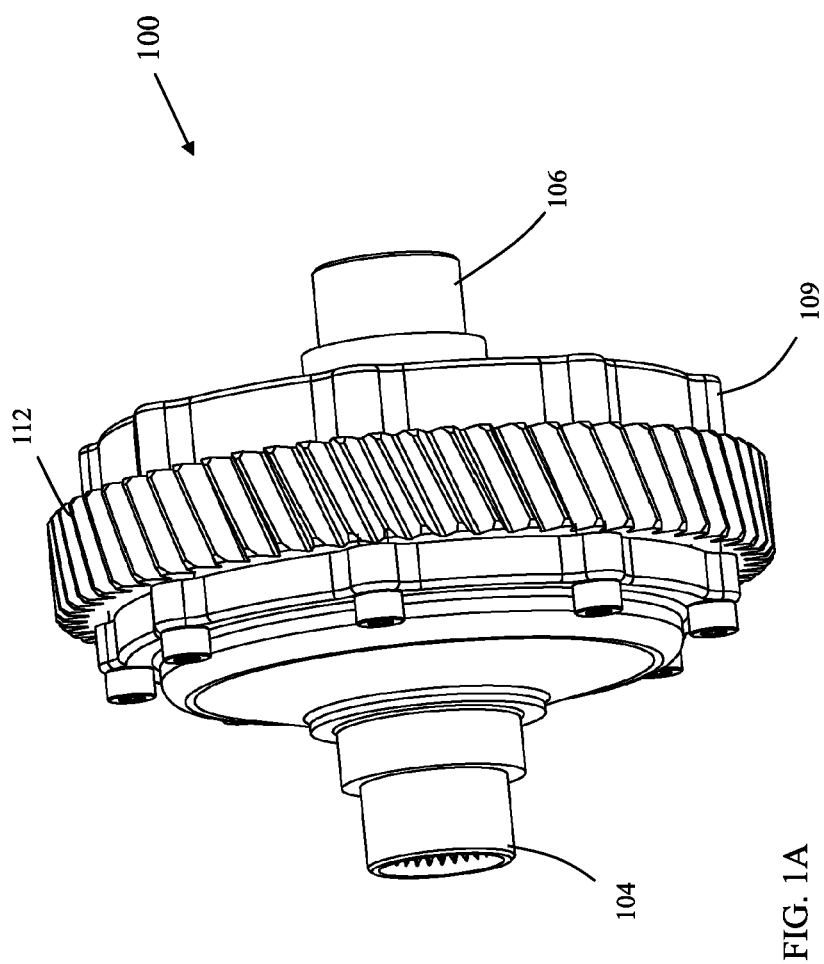
FIG. 1A is rear perspective view of a torque limiting clutch according to one exemplary embodiment.
Figure 1B:
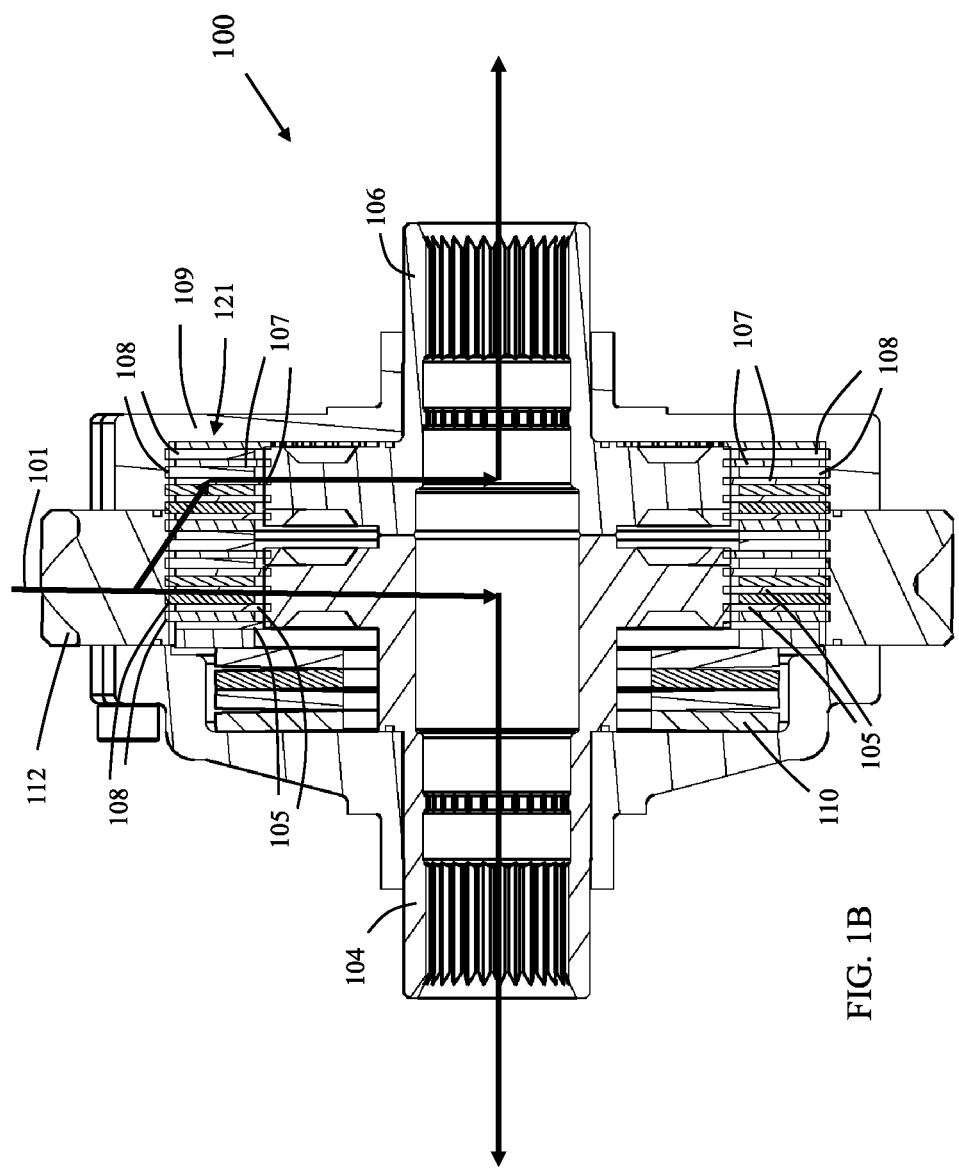
FIG. 1B is a cross-sectional rear view of the torque limiting clutch of FIG. 1A.

A first example embodiment of a TLC 100 is illustrated in FIGS. 1A and 1B. The torque limiting clutch includes a carrier 109 (housing), output members 104 and 106 and an input member 112. As illustrated in FIG. 1B, power (torque 101) flows into the TLC 100 through input member 112 (which may be a gear, sprocket, pulley, etc.). The torque 101 flows out of the TLC 100 through the two output members 104 and 106 (shafts). The carrier 109 supports the output members 104 and 106 and clutch mechanism (such as clutch plates 108 and spring member 110).

A clutch pack 121 (which may be wet or dry in embodiments) communicates torque between the input member 112 and output members 104 and 106. The clutch pack 121 in this example embodiment includes input clutch plates 108 and output clutch plates 105 and 107. Input clutch plates 108 are keyed (statically coupled) to carrier 109 while output clutch plates 105 are keyed to output member 104 and output clutch plates 107 are keyed to output member 106. Depending on space constraints, materials, load, etc., embodiments may include just a single plate per output member or a multi-plate configuration as illustrated in FIG. 1B where one large clutch pack 121 is used with half of the output clutch plates 105 keyed to one output member 104 and the other half of the output clutch plates 107 keyed to the other output member 106. Bias member 110 creates preload force to squeeze the clutch plates 108, 105 and 107 together to set a select torque slip condition. In particular, the force provided by the bias member 110 provides a select preload that sets a slip torque setting that determines a force needed to slip the operational communication between the input member 112 and each output member 104 and 106.

Figure 2:
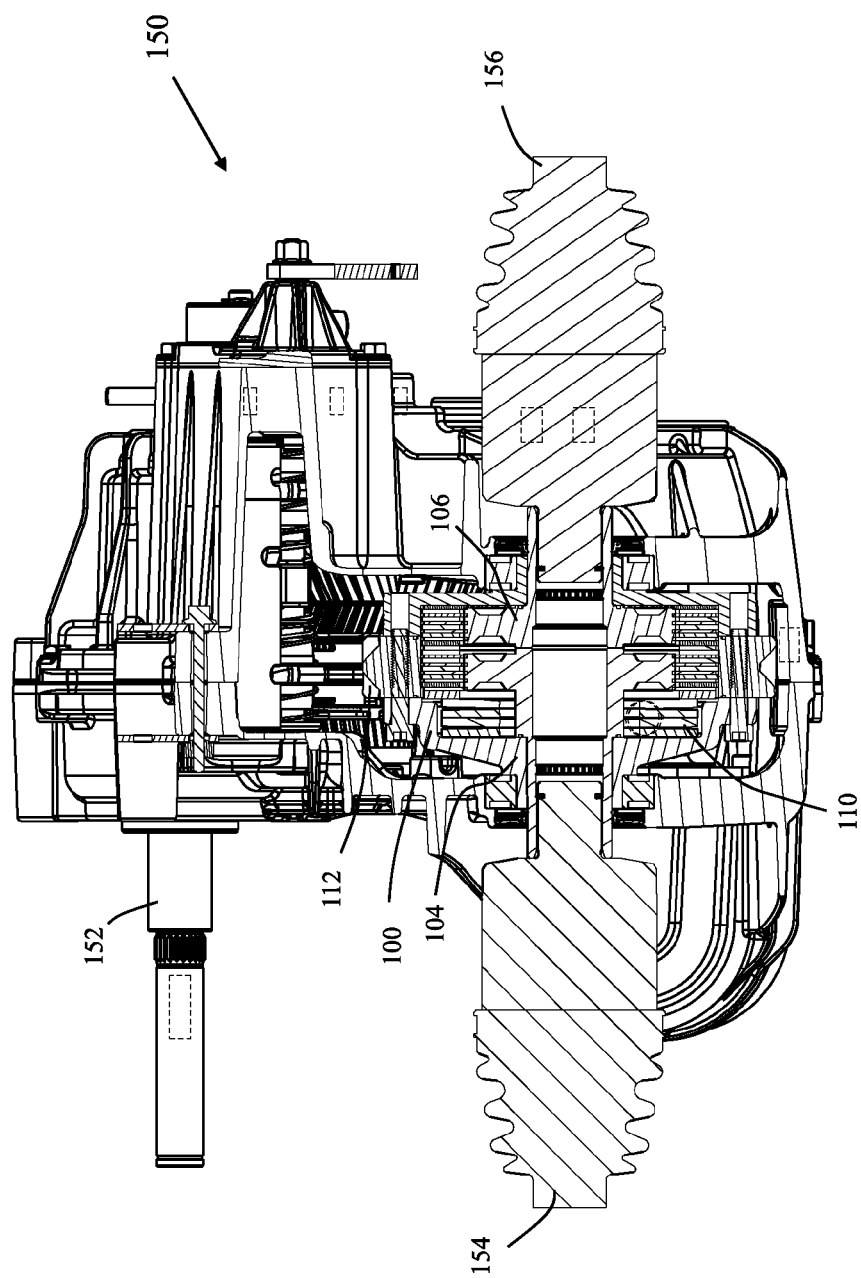
FIG. 2 is a cross-sectional rear view of a transaxle that includes a torque limiting clutch according to one exemplary embodiment.

An example of TLC 100 implemented in a transaxle 150 of an embodiment is illustrated in FIG. 2. The transaxle 150 may be implemented in a rear axle output of a utility vehicle (UTV), an all-terrain vehicle (ATV) or any other vehicle application using a transaxle. The transaxle 105 is illustrated as including a torque input shaft 152 that is in operation communication to receive torque generated by a motor (not shown in FIG. 2). Also illustrated in FIG. 2 are half shafts 154 and 156. As illustrated, half shaft 154 is operationally coupled to output member 104 of the torque limiting clutch 100 of the transaxle 150 and half shaft 156 is operationally coupled to output member 106.

In vehicles that use a transaxle, there may be situations where wheel torques can spike to undesirable levels, which can damage or break driveline or drivetrain system components. A TLC, such as TLC 100 helps limit or prevent this damage while allowing other drivetrain systems components to be smaller, lighter and less expensive. In some vehicles, it may be possible that large torque spikes occur at only one wheel. It may also be possible to have the spike occur simultaneously at two or more wheels. To protect the half-shafts connecting the transmission to the tires, TLCs in embodiment are set at a torque below the strength limit of the halfshaft.

Figure 3A:
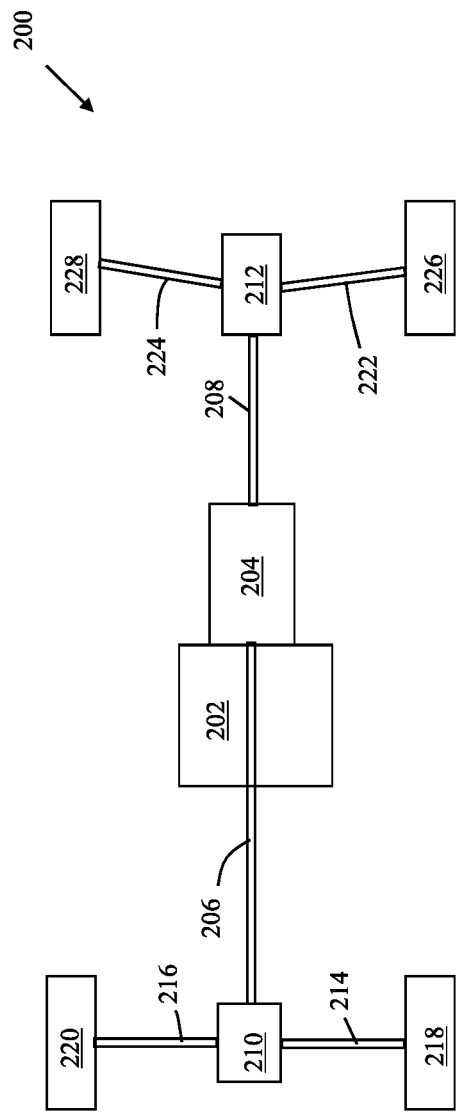
FIG. 3A is block diagram of a vehicle of the prior art.
Figure 3B:
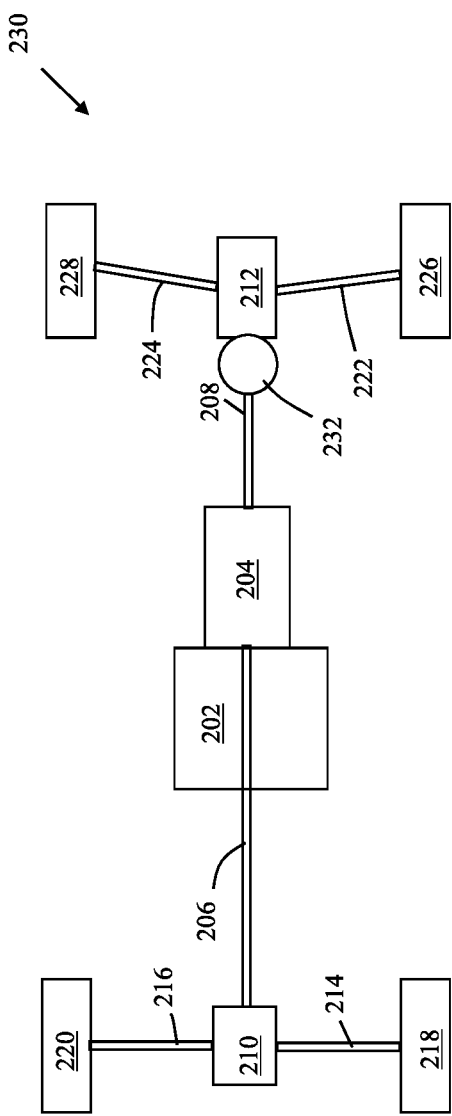
FIG. 3B is a block diagram of a vehicle with a torque limiting clutch implemented in a rear drive shaft of the prior art.

To further explain the benefits of embodiments, prior art FIGS. 3A and 3B are provided as further background. FIG. 3A is a block diagram of a vehicle 200 with a driveline know in the art. The vehicle 200 is illustrated as having an motor 202, a transmission 204, front drive shaft 206, rear drive shaft 208, a front axle gearbox 210, a rear axle gearbox 212, left front halfshaft 214, a right front halfshaft 216, front wheels 218 and 220, left rear halfshaft 222, right rear halfshaft 224 and rear wheels 226 and 228. The transmission 204 and rear axle gearbox 212 could be integrated in a single transaxle.

FIG. 3B is a block diagram of a vehicle 230 that includes a peak torque limiter 232 known in the art. The peak torque limiter 232 is a conventional style with a single input and single output, and is located upstream of the axle halfshafts 222 and 224. This design limits the combined maximum torque that can be delivered to the left and right rear halfshafts 222 and 224. For example, assuming a vehicle needs to be able to transmit 2000 Nm to the rear axle for an intended application. If the rear halfshafts 222 and 224 had a peak torque capacity of 1200 Nm, the total torque that can be transmitted if the load is even distributed to both rear wheels would be 2400 Nm. The axles are strong enough to achieve the maximum rear axle load of 2000 Nm. Above 2400 Nm, the halfshafts 222 and 224 would fail. If an event occurred where the vehicle sees a torque spike at one wheel of 1300 Nm, that halfshaft 222 or 224 would fail.

If the peak torque limiter 232 was in the rear drive shaft 208 (as illustrated in FIG. 3B), or inside the main transmission 204, on the rear output shaft or on the input shaft to the rear axle gearbox and had a slip torque value of 1000 Nm, the maximum torque available to the ground when both wheels have traction would be 1000 Nm. This would limit the peak torque to any single wheel to 1000 Nm, which would prevent halfshaft failure, but the vehicle capability is also reduced to 1000 Nm. If the vehicle is used in the manner that can create the 2000 Nm combined rear axle conditions, the peak torque limiter 232 would easily be forced to slip. If the operator continued to slip the peak torque limiter 232, it would create heat and/or noise, and eventually damage the peak torque limiter 232.

If the peak torque limiter 232 was set to 2200 Nm so the vehicle can reach its 2000 Nm rear axle requirement, then any event that creates a torque spike on one wheel has to also reach a level of 2200 Nm before the peak torque limiter 232 slips. By that time, the 1200 Nm limit has been exceeded on a single halfshaft 222 or 224 causing it to fail. The peak torque limiter 232 did nothing to protect the individual axle halfshaft 222 or 224. An example of a single wheel event would be jumping a vehicle and landing on one tire with the throttle applied.

Figure 4:
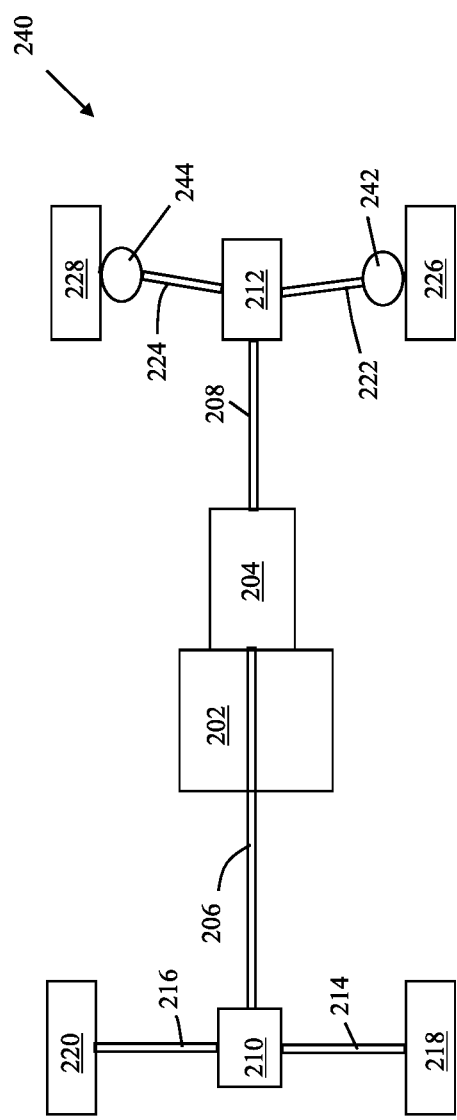
FIG. 4 is a block diagram of a vehicle with a torque limiting clutch implemented in a rear half shafts or wheels according to one exemplary embodiment.

One solution to independently address different torque spikes experienced at wheels 226 and 228 is illustrated in FIG. 4. FIG. 4 illustrates a block diagram of a vehicle 240 including TLC 242 and 244. This example puts a conventional TLC 242 and 244 with a single input/single output on each halfshaft 222 and 224 or integrates it into each wheel 226 and 228. However this design may add cost, weight and create packaging issues (because it would have to be designed around braking, wheel connecting structures, etc.) and hence may not be as desirable as other embodiments.

Figure 5:
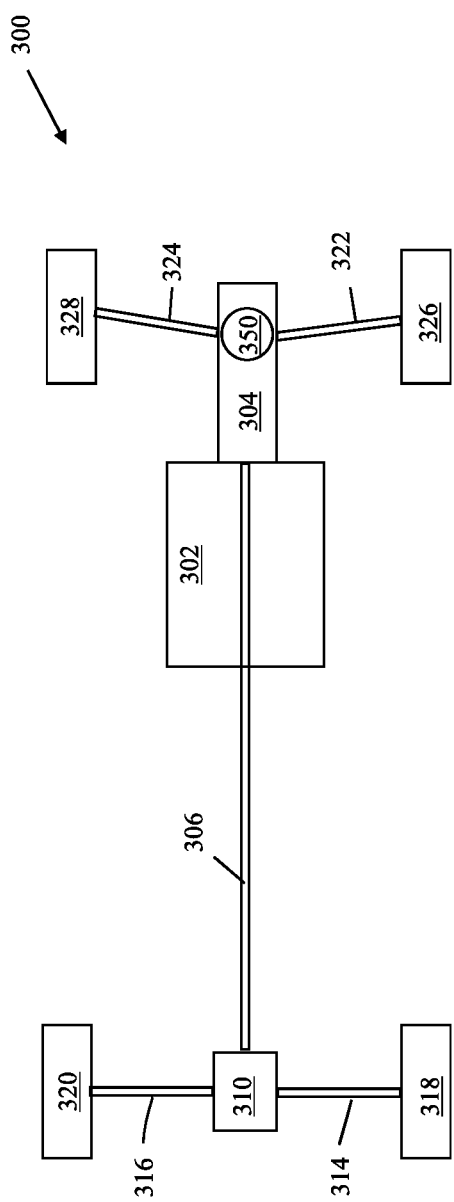
FIG. 5 is a block diagram of a vehicle with a torque limiting clutch implemented in a transaxle of one exemplary embodiment.

FIG. 5 illustrates a block diagram of a vehicle 300 including a TLC 350 that is integrated into a transaxle 304 of an embodiment. The TLC 350 is similar to the torque limiting clutch 100 integrated in to transaxle 150 of FIG. 2 discussed above. In this example embodiment, the rear wheels 326 and 328 that are coupled to associated halfshafts 322 and 324 are allowed to slip independently with the use of TLC 350. This configuration is able to handle large torque spikes that occur at only one wheel 326 and 328.

The vehicle 300 of FIG. 5 is further illustrated to include a motor 302 that provide engine torque to the transaxle 304 and a front drive shaft 306 that is in rotational communication with the transaxle 304. A front axle gear box 310 (differential) is further in rotational communication with the front drive shaft 306 as well as front halfshafts 314 and 316. The front halfshafts 314 and 316 are in turn rotationally coupled to wheels 318 and 320.

Figure 6:
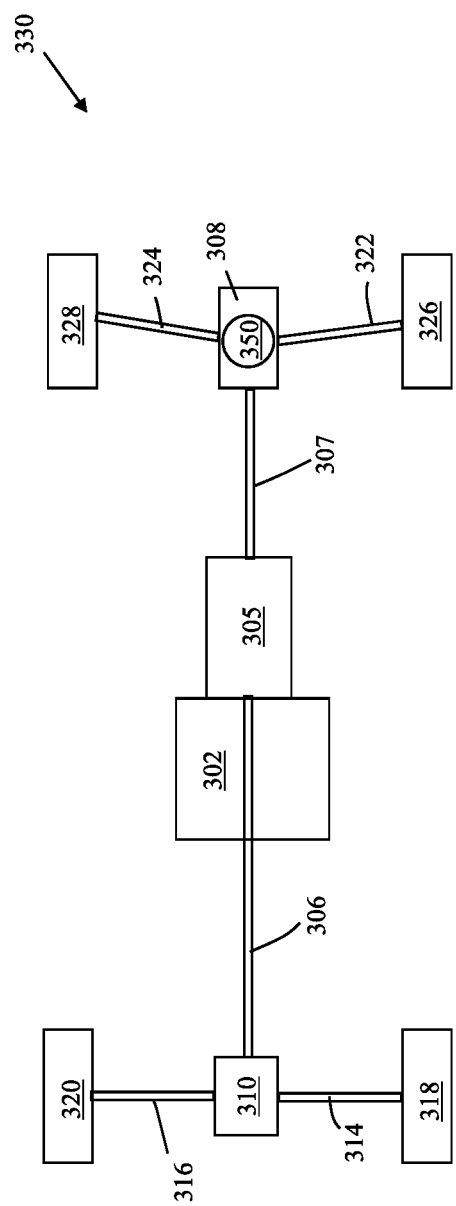
FIG. 6 is a block diagram of a vehicle with a torque limiting clutch implemented in a rear axle gear box according to one exemplary embodiment.

FIG. 6 illustrates a block diagram of a vehicle 330 that includes a PTL 350 that is integrated into the rear axle box 308 (differential) of an embodiment. In this example, a rear drive shaft 307 provides an input to the TLC 350 in the rear axle box 308. As with the embodiment of FIG. 5, outputs of the TLC 350 are rotationally coupled to the rear halfshafts 322 and 324. Further in this embodiment, a transmission 305 that is in rotational communication with the motor 302 is further in rotational communication with the rear drive shaft 307 and the front drive shaft 306. A TLC 350 can also be integrated in the front axle gearbox 310 or as illustrated in the vehicle 340 of FIG. 7, a TLC 350 can be integrated in both the front and rear axle boxes 310 and 308.

Figure 7:
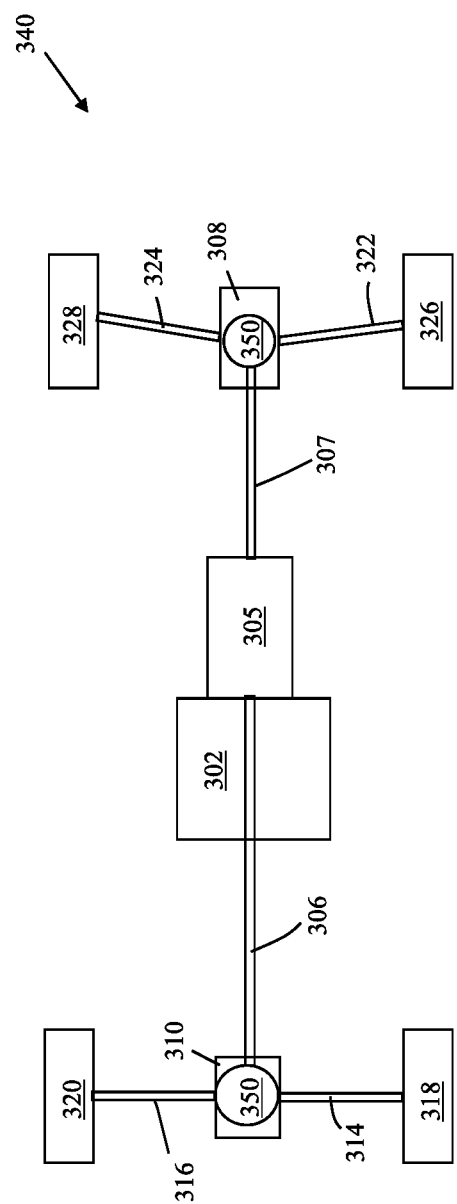
FIG. 7 is a block diagram of a vehicle with a torque limiting clutch implemented in both of a front axle gear box and a rear axle box according to exemplary embodiment.
Figure 8:
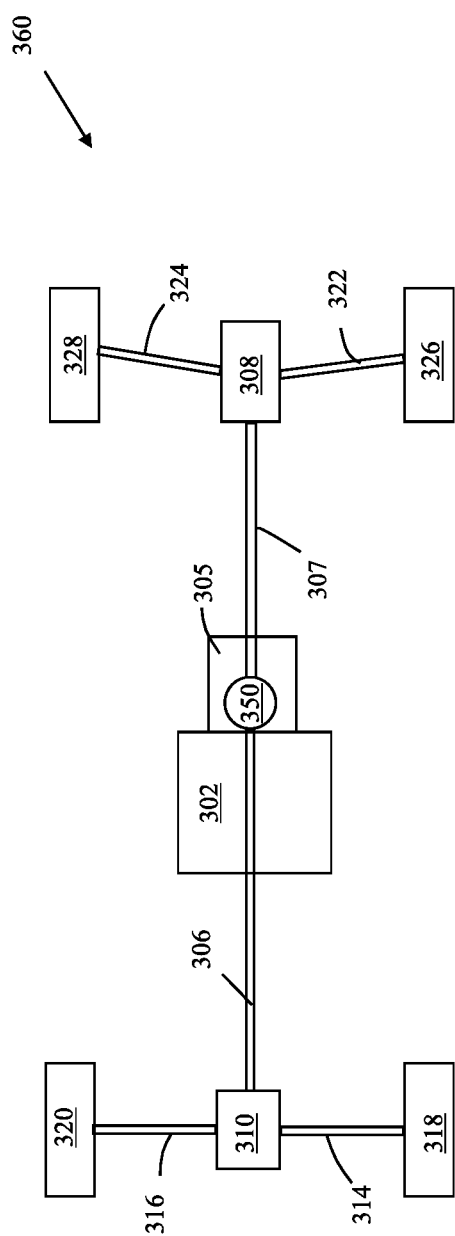
FIG. 8 is a block diagram of a vehicle with a torque limiting clutch implemented in a transmission according to one exemplary embodiment.

Another vehicle 360 embodiment example is illustrated in FIG. 8. In this embodiment, the PTL 350 is integrated in the transmission 305. An input to the TLC 350 is provided by the transmission 305. One output of the TLC is coupled to the rear drive shaft 307 and another output of the TLC 350 is coupled to the front drive shaft 306. As discussed, the two outputs of the TLC 350 may slip at the same time (in sync with each other), or they may slip independent of each other. Hence, FIGS. 5 through 8 illustrate possible locations of one or more TLC s in vehicle embodiments.

Figure 9:
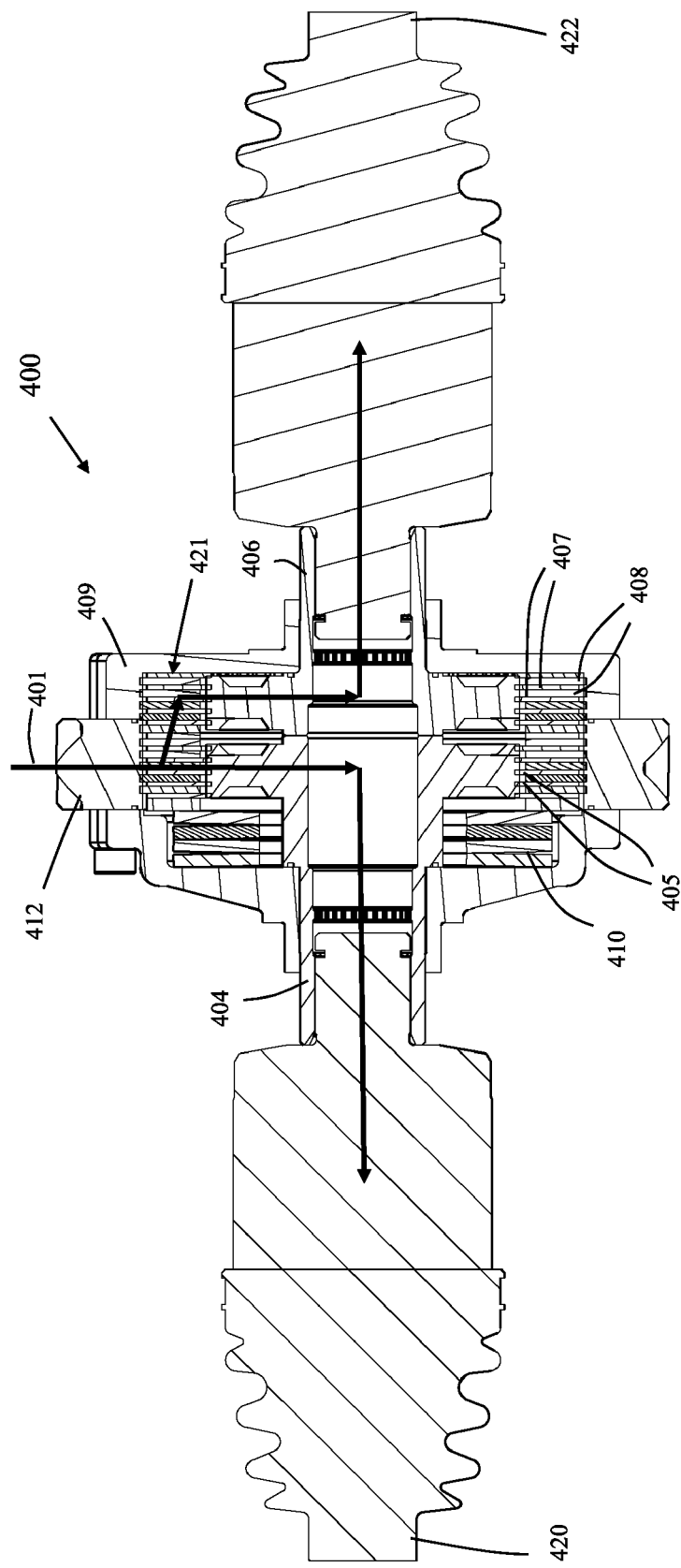
FIG. 9 is a cross-sectional rear view of a torque limiting clutch implemented in an axle gear box according to one exemplary embodiment.

FIG. 9 illustrates a cross-sectional rear view of a TLC 400 embodiment that could be integrated into the rear or front axle similar to the TLCs 350 illustrated in FIG. 7. TLC 400 includes a carrier 409, output members 404 and 406 and an input member 412. Power (torque 401) flows into the TLC 400 through input member 412 (which may be a gear, sprocket, pulley, etc.). The torque 401 flows out of the torque TLC 400 through the two output members 404 and 406 (shafts) to respective halfshafts 420 and 422. The carrier 409 supports the output members 404 and 406 and clutch mechanism (such as clutch plates 408 and spring members 410).

A clutch pack 421 (which may be wet or dry in embodiments) includes input clutch plates 408 that are keyed (coupled) to the carrier 409 and output clutch plates 405 and 407 that are respectively keyed to output members 404 and 406. Depending on space constraints, materials, load, etc., the clutch pack 412 may be a single plate per output or a multi-plate configuration as illustrated in FIG. 9. Bias member 410 creates preload force to squeeze the clutch plates 408, 405 and 407 to provide desired frictional characteristics to set a torque limit.

TLC 400 has a single input member 412 and two output members 404 and 406. The output members 404 and 406 may slip independent of each other or together. For example, in the previous example discussed above, if the clutch pack 421 is set so each respective output member 404 and 406 slips at 1100 Nm, this would allow a total torque throughput of 2200 Nm (above the vehicle's desired capacity to not affect the vehicles capability). If a torque spike exceeded 1100 Nm on either wheel, the TLC 400 would slip for that respective output member 404 or 406.

In other embodiments, instead of clutch plates, other configurations such as cone clutch surfaces, face cam, etc., may be used to separately communicate torque between the input and outputs. Moreover the bias member that creates the preload force on the clutch plates, cone clutch surfaces, face cam etc. may be coil springs, wave springs, disk springs (Bellville washer), elastomeric springs and the like. The bias member that creates preload may also be via hydraulic or pneumatic fluid pressure. Clutch surfaces that interact to create the torsional friction could be various materials: sintered, paper, steel, composites, etc., and they could run dry or lubricated.

Figure 10:
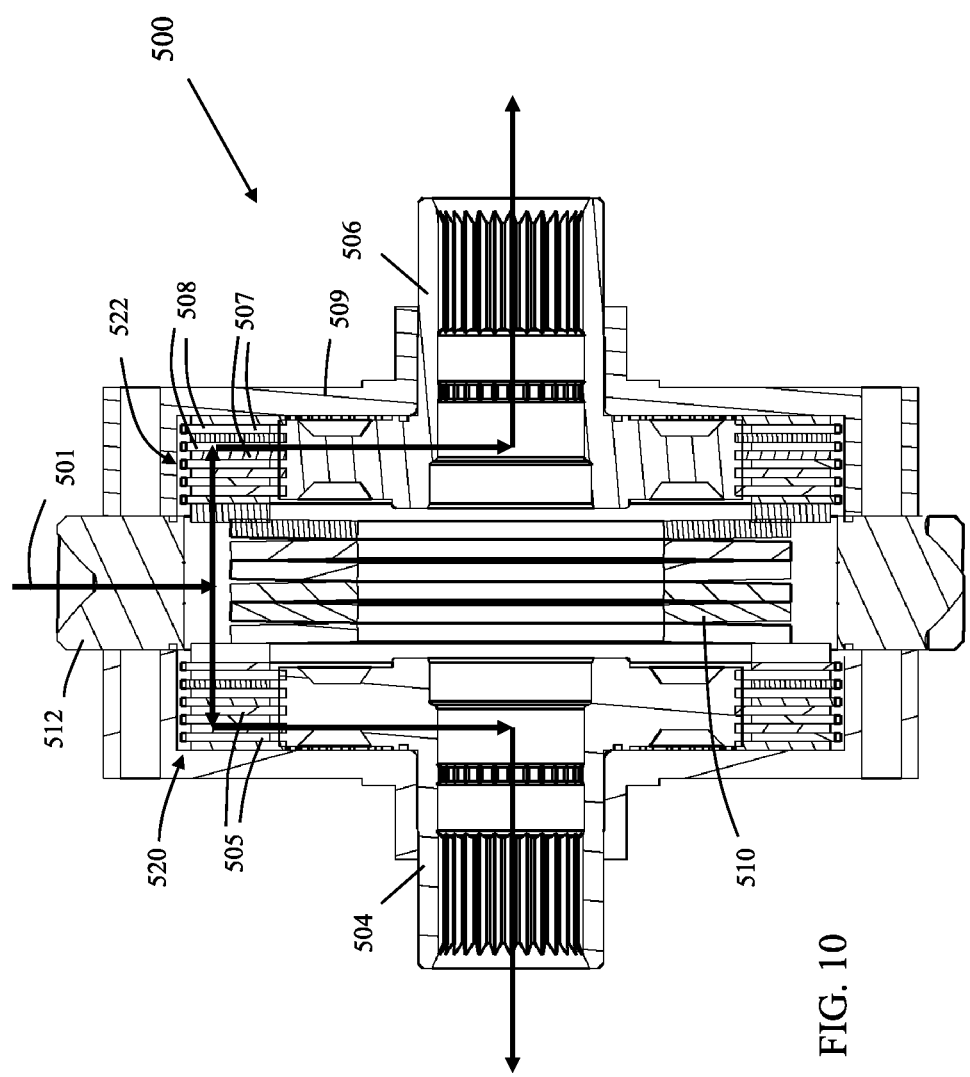
FIG. 10 is a cross-sectional rear view of a torque limiting clutch according to another exemplary embodiment.

FIG. 10 illustrates another embodiment of a TLC 500. In this embodiment, the bias member 510 is located between two separate clutch packs 520 and 522. Clutch pack 520 is formed by clutch plates 508 keyed to a carrier 509 and clutch plates 505 keyed to a first output member 504. Clutch pack 522 is formed by clutch plates 508 keyed to carrier 509 and clutch plates 507 keyed to a second output member 506. As illustrated in FIG. 10, in this embodiment, input torque 501 enters input member 512 then passes through the clutch packs 520 and 522 to the output members 504 and 506.

Figure 11:
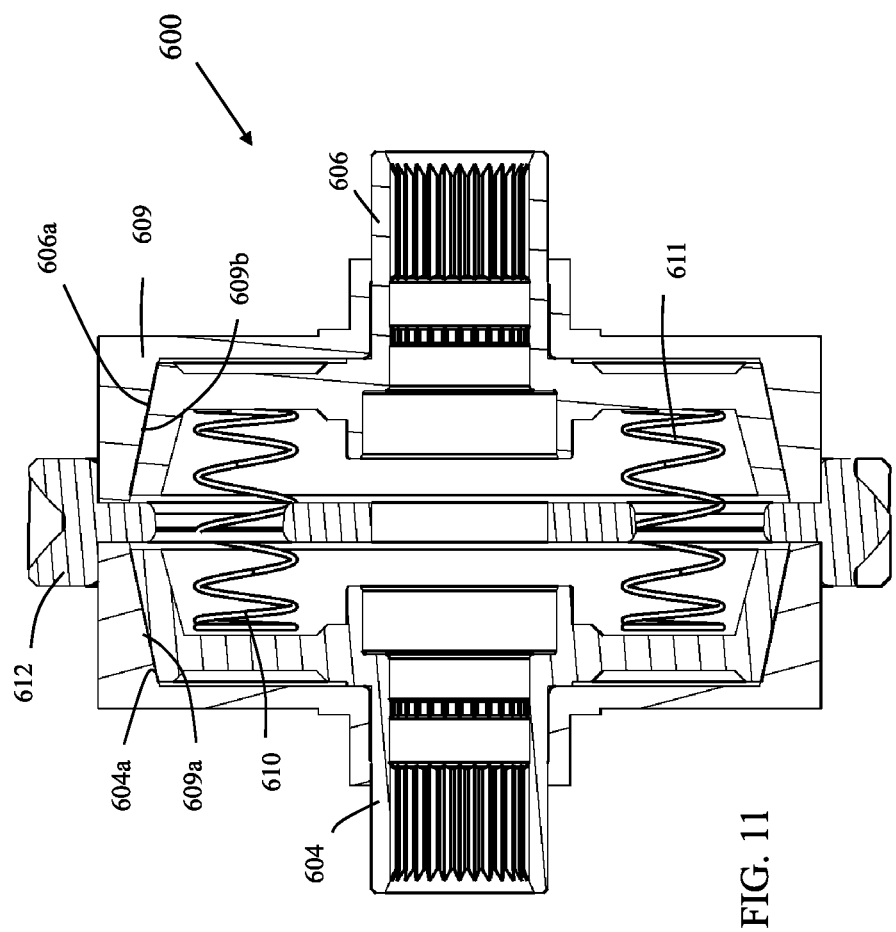
FIG. 11 is a cross-sectional rear view of a torque limiting clutch according to yet another exemplary embodiment.

Referring to FIG. 11, yet another embodiment of the TLC 600 is illustrated. In this embodiment, a cone clutch assembly is used to transfer torque from the input member 612 to the output members 604 and 606. Bias members 610 and 611 are located between portions of the output members 604 and 606 of the cone clutch assembly to assert a force on the output member 406 and 606 so that respective output engaging cone portions 604a and 606a of the output member 406 and 606 respectfully engage a carrier 609 inner cone engaging sections 609a and 609b of the housing 609. The force provided by the bias members 610 and 611 provide a select preload that sets a slip torque setting that determines a force needed to slip the operational communication between the input member 612 and each output member 604 and 606. In embodiments, the bias members 610 and 611 may be swapped out to achieve a different slip torque setting.

Figure 12:
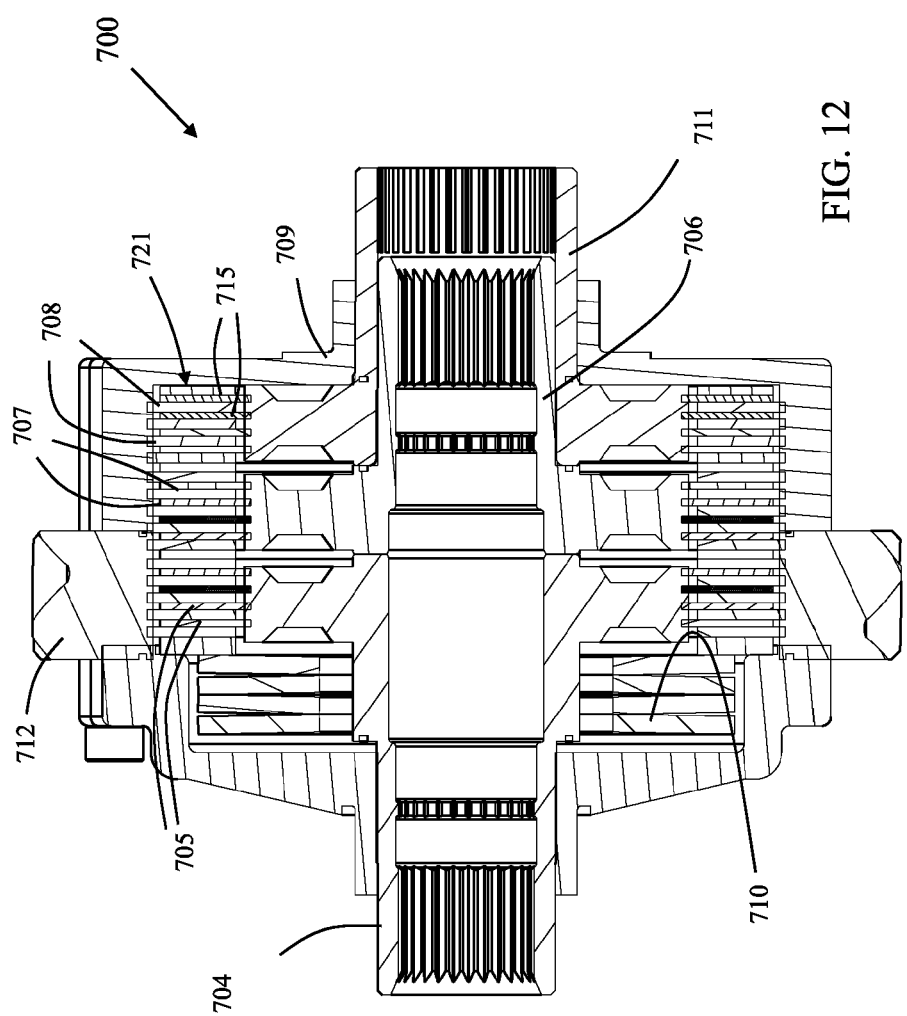
FIG. 12 is a cross-sectional rear view of a torque limiting clutch according to further another exemplary embodiment.

FIG. 12 illustrates yet another embodiment of a TLC 700. In this embodiment, multiple output members are provided from a single input member. In particular, the embodiment includes input member 712, first output member 704, second output member 706 and third output member 711. In this example embodiment, the first output member 704 is accessed from a first side of the TLC 700 while the second and third output members 706 and 711 are accessed from a second side of the TLC 700. Further in this embodiment, at least a portion of the second output member 706 is nested inside at least a portion of the third output member 711. A bias member 710 that is positioned between an inside wall of the housing 709 and the clutch pack 721 provides a bias force on the clutch pack 721 to set the torque limit.

The clutch pack 721 in this example embodiment includes clutch plates 708 keyed to housing/carrier 709, clutch plates 705 keyed to the first output member 704, clutch plates 707 keyed to the second output member 706 and clutch plates 715 keyed to the third output member 711. Input torque is provided through input member 712 that is coupled to carrier 709.

As discussed above, the embodiment example of FIG. 12 provides multiple outputs on one side of the TLC 700. The carrier 709 may be adjusted as needed to package the third output member 711 and the associated clutch pack 721. Hence, in an embodiment, two output members, exiting coaxially on the same side of the assembly may be provided, or in another embodiment the output members (one exiting one side, two on the other may be provided) or yet still in an embodiment four or more output members may be provided by selectively nesting the output members.

Figure 13A:
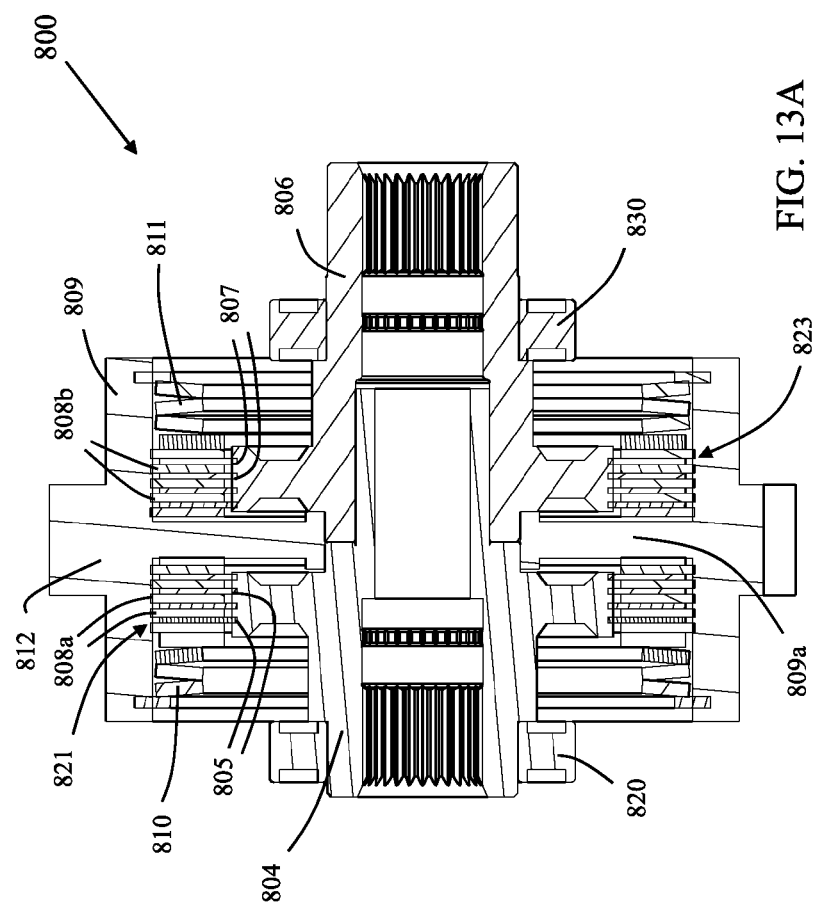
FIG. 13A is a cross-sectional rear view of a torque limiting clutch according to further yet another exemplary embodiment.
Figure 13B:
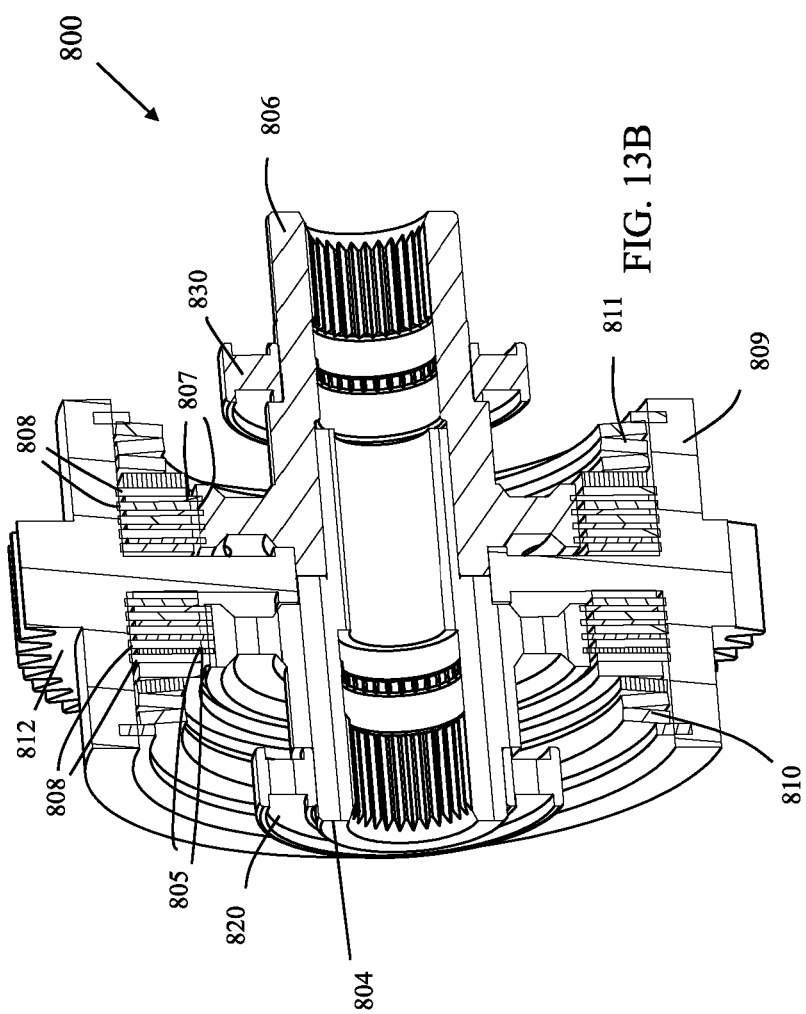
FIG. 13B is a cross-sectional rear perspective view of the torque limiting clutch of FIG. 13A.

Another example embodiment of a TLC 800 is illustrated in FIGS. 13A and 13B. This embodiment includes an input member 812 that is coupled to a carrier 809, a first output member 804 and second output member 806. Further in this embodiment, two clutch packs 821 and 823 separated by an inner wall 809a of the carrier 809 are used to covey torque between the input member 812 and output members 804 and 806. The first clutch pack 821 is formed by clutch plates 808a that are keyed to the carrier 809 and clutch plates 805 that are keyed to the first output member 804. The second clutch pack 823 is formed by clutch plates 808b that are keyed to the carrier 809 and clutch plates 807 that are keyed to the second output member 806. Bias member 810 provides a select force on the first clutch pack 821 and bias member 811 provides a select force on the second clutch pack 823. The force provided by the bias members 810 and 811 provide a select preload that sets a slip torque setting that determines a force needed to slip the operational communication between the input member 812 and each output member 804 and 806. If a desired application requires different slip forces between the first and second output members 804 and 806, one or both of the bias members 810 and 811 can be swapped out to provide different slip torque settings for the first output member 804 and the second output member 806.

The TLC 800 is further illustrated as including a first bearing 820 mounted on an outer surface of a portion of the first output member 804 and a second bearing 830 mounted on an outer surface of a portion of the second output member 806. In embodiments, the output members 804 and 806 are supported via the bearings 820 and 830 to one of a transmission housing, differential housing, axel gear box, transaxle and the like.

Figure 14A:
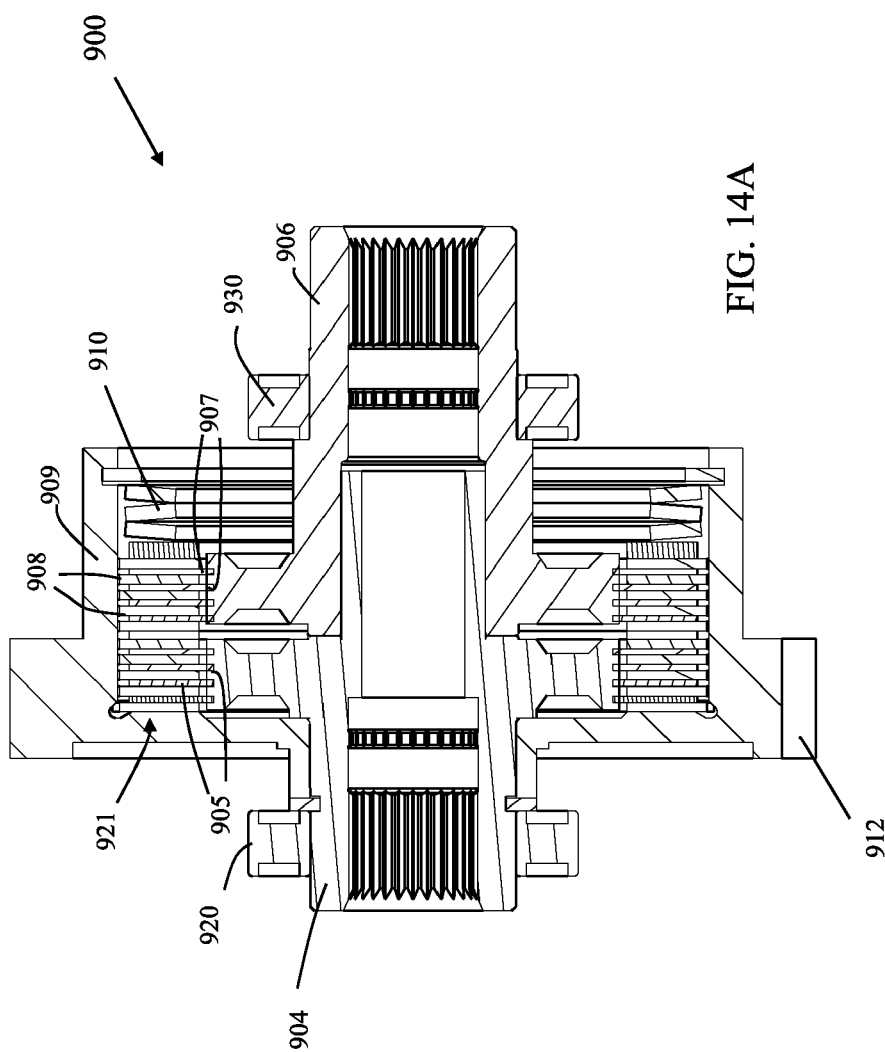
FIG. 14A is a cross-sectional rear view of a torque limiting clutch according to further yet another exemplary embodiment.
Figure 14B:
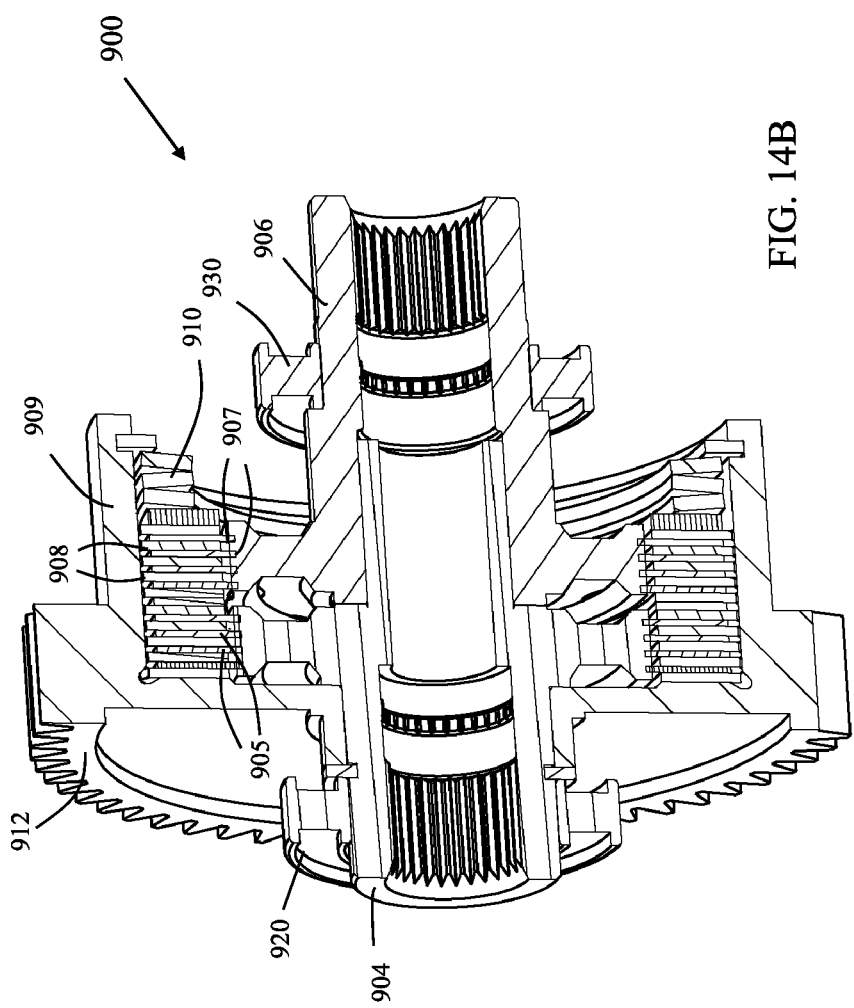
FIG. 14B is a cross-sectional rear perspective view of the torque limiting clutch of FIG. 14A.

Further yet, another example embodiment of a TLC 900 is illustrated in FIGS. 14A and 14B. This embodiment includes an input member 912 that is coupled to a carrier 909 and a first output member 904 and a second output member 906. Further in this embodiment, a clutch pack 921 is used to covey torque between the input member 912 and output members 904 and 906. In particular, clutch pack 921 includes clutch plates 908 that are keyed to the carrier 909, clutch plates 905 that are keyed to the first output member 904 and clutch plates 907 that are keyed to the second output member 906. Bias member 910 provides a select force on the clutch pack. The TLC 900 is further illustrated as including a first bearing 920 mounted on an outer surface of a portion of the first output member 904 and a second bearing 930 mounted on an outer surface of a portion of the second output member 906.

Another example embodiment of a TLC 1000 is illustrated in FIG. 15. This embodiment includes an input member 1012 that is coupled to a carrier 1009 and a first output member 1004 and a second output member 1006. Further in this embodiment, a clutch pack 1021 is used to covey torque between the input member 1012 and output members 1004 and 1006. In particular, clutch pack 1021 includes input clutch plates 1008 that are keyed to the carrier 1009, output clutch plates 1005 that are keyed to the first output member 1004 and output clutch plates 1007 that are keyed to the second output member 1006. Bias member 1010 provides a select force on the clutch pack. The TLC 1000 is further illustrated as including a first bearing 1020 mounted on an outer surface of a portion of the first output member 1004 and a second bearing 1030 mounted on an outer surface of a portion of the second output member 1006. The TLC 1100 further includes an adjusting nut 1050. The adjustment nut 1050 in this example embodiment includes an outer threaded surface 1050a that is threadably engaged with carrier interior threads 1009a of the carrier 1009. The adjustment nut 1050 further includes an engaging surface 1050b that engages a side of the bias member 1010. In this embodiment, the preload force provided by the bias member 1010 on the clutch pack 1021 may be adjusted by turning the adjustment nut 1050. Hence, in this embodiment, the bias member 1010 does not have to be swapped out to change the preload force.

Referring to FIG. 16, an application flow diagram 1100 of an embodiment is illustrated. The application flow diagram 1100 is provided as sequence of steps. The sequence, however, may be different in other embodiments. Hence, embodiments are not limited to the sequence set out in FIG. 16.

The application flow diagram 1100 of FIG. 16, starts by operationally communicating torque between an input member and at least two output members of a torque limiting clutch at step (1102). As described above, this may be done with a clutch pack, cone clutch surfaces, face cam surfaces and the like. A select torque limit is then set for the operational communication of the torque in step (1104). In embodiments this may be accomplished through the use of bias members that assert a select load on an associated clutch pack, cone clutch surfaces, face cam surfaces etc. In some embodiments, the torque limits may be different for one or more of the output members. Further in some embodiments the select torque limit may be changed depending on the desired characteristics of the application. Changing the torque limits may involve replacing one or more bias members, changing the number of clutch plates, and/or adjusting an adjusting nut in some embodiments. The application flow diagram continues at step (1106) where the torque limiting clutch is integrated into a drivetrain component of a vehicle. As discussed above, the drivetrain component may include, a transaxle, a transmission, a rear axle gear box, a front axle gear box or any component where torque is split off from one member to multiple members.

Although, the torque limiting clutch in some of the examples discussed above are discussed as being applied in a vehicle drivetrain, the torque limiting clutch may be used in any application where torque is split and independent slip of the operational communication between an input member and multiple output members is desired.

EXAMPLE EMBODIMENTS

Example 1 is a torque limiting clutch that includes an input member and at least two output members. The input member is configured to receive torque. Each output member is in operational communication with the input member to transfer torque between the input member and each output member. Each output member is configured to slip the operational communication with the input member when a torque above a set torque limit is encountered. Further wherein the slip of the operational communication between the input member and one output member of the at least two output members is independent of the operational communication between the input member and any other output member of the at least two output members.

Example 2, includes the torque limiting clutch of Example 1, further including at least one bias member configured to provide a preload force to at least in part set the torque limit.

Example 3 includes the torque limiting clutch of Example 2, wherein the at least two output members are configured to have different torque limits.

Example 4 includes the torque limiting clutch of Example 2, wherein the at least one bias member is a single bias member that is configured to provide the preload for all of the at least two output members.

Example 5 includes the torque limiting clutch of any of the Examples 1-4, further including at least one clutch pack to provide the operational communication between the input member and the at least two output members.

Example 6 includes the torque limiting clutch of Example 5, further including a carrier, at least one input clutch plate, at least one first output clutch plate, at least one second output clutch plate and at least one bias member. The carrier is coupled to the input member. The at least one input clutch plate is keyed to the carrier. The at least one first output clutch plate is keyed to a first one of the at least two output members. The at least one second output clutch plate is keyed to a second one of the at least two output members. The at least one input clutch plate is positioned in relation to the at least one first output clutch plate and the at least one second output clutch plate to form the at least one clutch pack. The at least one bias member positioned to provide a preload force on the at least one input clutch plate, the at least one first clutch plate and the at least one second clutch plate that form the at least one clutch pack to at least in part set the torque limit.

Example 7 includes the torque limiting clutch of Example 6, further wherein the at least one input clutch plate includes a plurality of input clutch plates keyed to the carrier. The at least one first output clutch plate includes a plurality of first output clutch plates keyed to the first output member. A first set of the plurality of input clutch plates and the plurality of first output clutch plates are positioned in an alternating configuration in relation to each other. The at least one second output clutch plate includes a plurality of second output clutch plates keyed to the second output member. The second set of the plurality of input clutch plates and the plurality of second output clutch plates are positioned in an alternating configuration in relation to each other.

Example 8 includes the torque limiting clutch of any of the Examples 1-7, further including at least one third output member. Each third output member being in operational communication with the input member to transfer torque between the input member and each third output member. Each third output member is configured to slip the operational communication with the input member independently in relation to each of the at least two output members.

Example 9 includes the torque limiting clutch of Example 8, further wherein each third output member is in a nested configuration with an associated one of the at least two output members.

Example 10 is a vehicle with drivetrain protection. The vehicle includes a motor to generate engine torque, a drivetrain operationally coupled to receive the engine torque from the motor and a torque limiting clutch integrated within a component of the drivetrain. The torque limiting clutch includes an input member and at least two output members. The input member is operationally coupled to receive the engine torque. Each output member is in operational communication with the input member to transfer torque between the input member and each output member. Each output member is configured to slip the operational communication with the input member when a torque above a set limit is encountered. The slip of the operational communication between the input member and one output member of the at least two output members is independent of the operational communication between the input member and any other output member of the at least two output members.

Example 11 includes the vehicle of Example 10, further including at least one bias member configured to provide a preload force to at least in part set the torque limit.

Example 12 includes the vehicle of any of the examples 10-11, wherein the at least two output members are configured to have different torque limits.

Example 13 includes the vehicle of any of the Examples 10-12, further including at least one clutch pack and at least one bias member. The at least one clutch pack is used to provide the operational communication between the input member and the at least two output members. The at least one bias member is configured to provide a preload force on the at least one clutch pack to at least in part set the torque limit.

Example 14 includes the vehicle of any of the Examples 10, 12-13, further including a carrier, a plurality of input clutch plates, a plurality of at least one first output clutch plates, a plurality of at least one second output clutch plates. The carrier is coupled to the input member. The plurality of input clutch plates are keyed to the carrier. The plurality of at least one first output clutch plates are keyed to a first one of the at least two output members. The plurality of a least one second output clutch plates are keyed to a second one of the at least two output members. Further wherein the plurality of input clutch plates are positioned in relation to the plurality of first output clutch plates and the plurality of second output clutch plates to form at least one clutch pack. The at least one bias member is positioned to provide a preload force on the at least one clutch pack to at least in part set the torque limit.

Example 15 includes the vehicle of any of the Examples 10-14, wherein the component of the drivetrain is at least one of a transaxle, a transmission, a rear axle gear box and a front axle gear box.

Example 16 includes a method of protecting vehicle drivetrain components, the method includes operationally communicating torque between an input member and at least two output members of the torque limiting clutch, wherein torque communication between the input member and one of the at least two output members is independent from the torque communication between the input member and each other output member of the at least two output members; setting torque limits for the operationally communicated torque between the first input member and each of the at least two outputs; and positioning an input member of a torque limiting clutch in an engine torque path within a drivetrain component of a drivetrain.

Example 17 includes the method of Example 16, further wherein setting torque limits for the operationally communicated torque between the first input member and each of the at least two outputs, further includes selecting a bias member to provide a desired preload force.

Example 18 includes the method of Example 17, further including applying the preload force to cause input clutch plates keyed to the input member to engage output clutch plates keyed to the at least two output members.

Example 19 includes the method of any of the Examples 16-18, further wherein setting torque limits for the operationally communicated torque between the first input member and each of the at least two outputs, further includes setting different torque limits associated with each output member.

Example 20 includes the method of and of the examples 16-19, further including nesting at least one output member with another output member of the at least two output members.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A torque limiting clutch comprising:
an input member configured to receive torque; and
at least two output members, each output member in operational communication with the input member to transfer torque between the input member and each output member, each output member configured to slip the operational communication with the input member when a torque above a set torque limit is encountered, wherein the slip of the operational communication between the input member and one output member of the at least two output members is independent of the operational communication between the input member and any other output member of the at least two output members.

2. The torque limiting clutch of claim 1, further comprising:
at least one bias member configured to provide a preload force to at least in part set the torque limit.

3. The torque limiting clutch of claim 2, wherein the at least two output members are configured to have different torque limits.

4. The torque limiting clutch of claim 2, wherein the at least one bias member is a single bias member that is configured to provide the preload for all of the at least two output members.

5. The torque limiting clutch of claim 1, further comprising:
at least one clutch pack to provide the operational communication between the input member and the at least two output members.

6. The torque limiting clutch of claim 5, further comprising:
a carrier coupled to the input member;
at least one input clutch plate keyed to the carrier;
at least one first output clutch plate keyed to a first one of the at least two output members;
at least one second output clutch plate keyed to a second one of the at least two output members, wherein the at least one input clutch plate is positioned in relation to the at least one first output clutch plate and the at least one second output clutch plate to form the at least one clutch pack and;
at least one bias member positioned to provide a preload force on the at least one input clutch plate, the at least one first clutch plate and the at least one second clutch plate that form the at least one clutch pack to at least in part set the torque limit.

7. The torque limiting clutch of claim 6, further wherein:
the at least one input clutch plate includes a plurality of input clutch plates keyed to the carrier;
the at least one first output clutch plate includes a plurality of first output clutch plates keyed to the first output member, a first set of the plurality of input clutch plates and the plurality of first output clutch plates positioned in an alternating configuration in relation to each other; and
the at least one second output clutch plate includes a plurality of second output clutch plates keyed to the second output member, a second set of the plurality of input clutch plates and the plurality of second output clutch plates positioned in an alternating configuration in relation to each other.

8. The torque limiting clutch of claim 1, further comprising:
  at least one third output member, each third output member being in operational communication with the input member to transfer torque between the input member and each third output member, each third output member configured to slip the operational communication with the input member independently in relation to each of the at least two output members.

9. The torque limiting clutch of claim 8, further wherein:
  each third output member in a nested configuration with an associated one of the at least two output members.

10. A vehicle with drivetrain protection, the vehicle comprising:
  a motor to generate engine torque;
  a drivetrain operationally coupled to receive the engine torque from the motor; and
  torque limiting clutch integrated within a component of the drivetrain, the torque limiting clutch including,
    an input member operationally coupled to receive the engine torque, and
    at least two output members, each output member in operational communication with the input member to transfer torque between the input member and each output member, each output member configured to slip the operational communication with the input member when a torque above a set limit is encountered, wherein the slip of the operational communication between the input member and one output member of the at least two output members is independent of the operational communication between the input member and any other output member of the at least two output members.

11. The vehicle of claim 10, further comprising:
  at least one bias member configured to provide a preload force to at least in part set the torque limit.

12. The vehicle of claim 10, wherein the at least two output members are configured to have different torque limits.

13. The vehicle of claim 10, further comprising:
  at least one clutch pack to provide the operational communication between the input member and the at least two output members:
  at least one bias member configured to provide a preload force on the at least one clutch pack to at least in part set the torque limit.

14. The vehicle of claim 10, further comprising:
  a carrier coupled to the input member;
  a plurality of input clutch plates keyed to the carrier;
  a plurality of first output clutch plates keyed to a first one of the at least two output members;
  a plurality of second output clutch plates keyed to a second one of the at least two output members, wherein the plurality of input clutch plates are positioned in relation to the plurality of first output clutch plates and the plurality of second output clutch plates to form at least one clutch pack and; and
  at least one bias member positioned to provide a preload force on the at least one clutch pack to at least in part set the torque limit.

15. The vehicle of claim 10, wherein the component of the drivetrain is at least one of a transaxle, a transmission, a rear axle gear box and a front axle gear box.

16. A method of protecting vehicle drivetrain components, the method comprising:
  operationally communicating torque between an input member and at least two output members of a torque limiting clutch, wherein torque communication between the input member and one of the at least two output members is independent from the torque communication between the input member and each of the other output members of the at least two output members;
  setting torque limits for the operationally communicated torque between the input member and each of the at least two outputs, wherein the torque limits set forces needed to slip operational communications between the input member and each of the at least two output members; and
  positioning an input member of the torque limiting clutch in an engine torque path within a drivetrain component of a drivetrain.

17. The method of claim 16, further wherein setting torque limits for the operationally communicated torque between the input member and each of the at least two outputs, further comprises:
  selecting a bias member to provide a desired preload force.

18. The method of claim 17, further comprising:
  applying the preload force to cause input clutch plates keyed to the input member to engage output clutch plates keyed to the at least two output members.

19. The method of claim 16, further wherein setting torque limits for the operationally communicated torque between the input member and each of the at least two outputs, further comprises:
  setting different torque limits associated with each output member.

20. The method of claim 16, further comprising:
  nesting at least one output member with another output member of the at least two output members.

* * * * *

UNITED STATES PATENT AND TRADEMARK OFFICE
CERTIFICATE OF CORRECTION

| | |
|---|---|
| PATENT NO. | : 10,899,334 B2 |
| APPLICATION NO. | : 16/169854 |
| DATED | : January 26, 2021 |
| INVENTOR(S) | : Maki |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 157 days.

Signed and Sealed this
Fourteenth Day of February, 2023

Katherine Kelly Vidal
*Director of the United States Patent and Trademark Office*